United States Patent Office 3,179,677
Patented Apr. 20, 1965

3,179,677
PROCESS FOR PREPARING ORGANO ALUMINUM TELOMERS
Robert A. Walde and Russell G. Hay, Pittsburgh, Pa., assignors to Goodrich-Gulf Chemicals, Inc., Cleveland, Ohio, a corporation of Delaware
No Drawing. Filed Sept. 13, 1960, Ser. No. 55,710
6 Claims. (Cl. 260—448)

This invention relates to a process for adding ethylene to an alkyl aluminum chloride and more particularly to a process for inserting ethylene units between the aluminum atom and the carbon atom of the original alkyl group. The products resulting from such addition or insertion are generally termed "organo aluminum telomers."

The first step in the process of this invention involves the preparation of an alkyl aluminum chloride in accordance with the following type reaction:

$$AlR_3 + AlCl_3 \rightarrow R_2AlCl + RAlCl_2$$

wherein R is an alkyl group having from one to 10 carbon atoms such as methyl, ethyl, propyl, isopropyl, n-butyl, isobutyl, n-pentyl, isopentyl, 2-methyl-butyl, n-hexyl, 3-methyl-pentyl, n-heptyl, 4-methyl-hexyl, n-octyl, 4-ethyl-hexyl, n-nonyl, 3-ethyl-heptyl, n-decyl, 3-ethyl-octyl, etc. The alkyl groups on the charge aluminum alkyl need not be similar to each other. Preferably R is methyl, ethyl, propyl, n-butyl, isobutyl or isopentyl. The reactants can be employed over a wide range if desired, but preferably are employed in approximately equal molar amounts. The ratio of products, $R_2AlCl$ and $RAlCl_2$, obtained will be from about 1:0 (for a 2:1 molar ratio of $AlR_3:AlCl_3$) to about 0:1 (for a 1:2 molar ratio of $AlR_3:AlCl_3$). The reaction can be carried out at a pressure of about −10 to about 100 pounds per square inch gauge over a period of about 5 to about 360 minutes.

The alkyl aluminum chlorides so produced are then activated in order to facilitate the entry of the ethylene molecules into the alkyl aluminum chlorides between the aluminum atom and a carbon atom of the hydrocarbon radical of the mixed alkyl aluminum chlorides. This is effected by dispersing the mixed alkyl aluminum chlorides in an inert hydrocarbon solvent such as n-heptane, benzene, toluene, isooctane, n-octane, etc., although it is not necessary to the success of the reaction that a solvent be used, under a blanket of inert gas such as helium, nitrogen, argon, ethane, methane, etc., and thereafter bubbling through the resulting liquid a stream of ethylene gas until the alkyl aluminum chlorides are thoroughly saturated with ethylene. During the period that the mixed alkyl aluminum chlorides are being activated or saturated, which can be from about one to about 60 minutes, the desired chain growth which is to be effected does not take place. If desired the activation with ethylene can be effected simultaneously with the production of the aluminum chlorides.

The desired chain growth is obtained by adding to the ethylene-saturated mixed alkyl aluminum chlorides described above, while the same is at a temperature of about 0° to about 100° C., titanium tetrachloride, in a molar ratio of Ti:Al of about 1/500 to 1/50, preferably about 1/250 to 1/150. During the addition of the titanium tetrachloride and/or subsequent thereto ethylene at a rate which can be, for example, about 0.3 to about 60 mols per hour per mol of alkyl aluminum chloride is passed therethrough and absorbed by the activated alkyl aluminum chloride. This is continued for about 30 to about 360 minutes or until the desired number of ethylene molecules have been added to the alkyl aluminum chlorides. The organo aluminum telomer obtained can be represented as follows:

$$[R(CH_2-CH_2)_a]_2AlCl$$

and $$R(CH_2-CH_2)_aAlCl_2$$

wherein R can be as defined hereinabove and $a$ is an integer from one to 15, preferably 2 to 10. The addition described above can be effected at a temperature of about 40° to about 150° C., preferably about 50° to about 100° C., and a pressure of about −10 to about 100 pounds per square inch gauge.

The organo aluminum telomers produced can be hydrolyzed to obtain paraffins or oxidized and then hydrolyzed to obtain alcohols. To obtain paraffins the organo aluminum telomer is hydrolyzed with at least about 3 gram mols of water, in the presence, preferably, of a catalyst such as dilute hydrochloric acid, per gram atom of aluminum. An aqueous phase containing the aluminum hydroxy chloride and an organic phase containing mixed paraffins are obtained. To prepare the alcohol from the organo aluminum telomers they are first oxidized at a temperature of about 30° to about 100° C. and a pressure from about atmospheric to about 500 pounds per square inch gauge for about 15 to about 60 minutes. About one mol of oxygen for each two mols of alkyl groups to be oxidized is sufficient. The aluminum alkoxy chloride obtained is then hydrolyzed in the manner described above. An alcohol and an aluminum hydroxy chloride are obtained.

In the past it has always been considered critical that the aluminum chloride employed in the reaction with the aluminum alkyl be of the utmost purity, otherwise the mixed alkyl aluminum chlorides so produced would be ineffective in the telomerization reaction. We have found that an impure aluminum chloride can be employed in the reaction with the aluminum alkyl and the alkyl aluminum chloride thus produced will be effective in the subsequent telomerization reaction. Since considerable quantities of aluminum chloride are consumed in this process a definite economic advantage can be obtained in the use of less expensive impure grades of commercial aluminum chloride in contrast to the use of very expensive pure grades of aluminum chloride. Desirably the mixture produced as a result of the reaction between the impure aluminum chloride and the aluminum alkyl is first subjected to a filtration operation. In general the filtration can be effected by passing the reaction mixture through a fritted filter having a pore size of about 5 to about 65 microns, preferably about 10 to about 20 microns, and may be constituted of fritted glass, fritted stainless steel, etc.

Left behind on the filter in such case are solid particulate materials which are apparently insoluble. The mixture produced as a result of the reaction between pure aluminum chloride and aluminum alkyl is a clear, colorless liquid in most cases. The filtrate obtained as a result of such filtration of the reaction product obtained from impure aluminum chloride contains the desired alkyl aluminum chlorides but apparently in addition still contains some other matter, since it is a dark liquid. Nevertheless the dark filtrate, as well as the reaction product prior to filtration, is suitable for use in the telomerization reaction. In reacting the impure aluminum chloride with the aluminum alkyl it is desirable to use an elevated temperature on the order of about 40° to about 150° C., preferably about 50° to about 120° C. The remaining reaction conditions are as set forth hereinabove.

By "impure aluminum chloride," we mean to include materials containing from about 80 to about 99 percent by weight of an aluminum chloride, with the remainder comprised of the chlorides of the metals silicon, titanium, iron and other heavy metals. A particularly desirable impure aluminum chloride is produced as follows from an aluminum oxide ore containing about 58 percent by weight of aluminum oxide. The ore is heated for a sufficient length of time to drive off the water associated therewith to obtain a resultant composition containing from 90 to 95 percent by weight of aluminum oxide, less than 5 percent silica, 3 percent ferric oxide and from one to 2 percent titanium oxide. The dry ore obtained is mixed in a 3:1 weight ratio with coking coal, and the mixture is pulverized and pressed at 3000 pounds per square inch gauge into two-pound bricks. The bricks are thereafter charged to a furnace, heated to 1500° F. to drive off water and hydrocarbons present and then charged to a chlorination furnace where they are heated in a stream of air to 1600° F. The air flow is shut off and chlorine is introduced therein at 1600° F., additional chlorine being added as needed. The aluminum chloride which is formed is sublimed from the chlorination furnace and condensed. The condensed product has the following purity range:

| | Percent by weight |
|---|---|
| Silicon tretrachloride | Nil–½ |
| Titanium tetrachloride | ½–2 |
| Ferric chloride | ½–4 |
| Aluminum chloride | 98.0–88.5 |

The remainder, unaccounted for, represents nonvolatiles and can be from about one to about 5 percent by weight.

We have additionally found that in order to accelerate the absorption of ethylene during the telomerization reaction it is necessary to activate or saturate the total reaction product obtained using impure aluminum chloride or the filtrate obtained therefrom containing the alkyl aluminum chlorides with ethylene at an elevated temperature on the order of about 40° to about 150° C., preferably about 50° to about 120° C., prior to the addition thereto of the titanium tetrachloride. While we are not certain why this is so we believe that the total reaction product or filtrate contains small amounts of materials which have a tendency to inhibit or slow down the telomerization reaction. When the activation step is carried out at elevated temperatures, as described, such materials apparently react with some of the ethylene used during the step and are thereby rendered innocuous in the subsequent telomerization reaction.

As noted, both the reaction of the aluminum alkyl and aluminum chloride, and the ethylene saturation can be simultaneously carried out by passing a stream of ethylene through the system while reacting the aluminum alkyl and aluminum chloride at a temperature of about 40° to about 150° C., preferably about 50° to about 120° C.

The invention can be illustrated by reference to the following examples.

That an impure aluminum chloride can be employed with good results in accordance with the process of this invention is apparent from the following.

In the following examples all equipment is clean, dry and completely flushed with dry prepurified nitrogen. It is to be understood that the term "ethylene is passed therethrough" means that dry, pure ethylene is added to the system at a rate such that there is a slight excess, over and above that absorbed, being vented from the system; and that ethylene addition is carried out with sufficiently good mixing to insure good contact between the ethylene and alkyl aluminum chloride.

Example I 42.3 grams of an impure aluminum chloride analyzing as follows:

| | Percent by weight |
|---|---|
| Silicon tetrachloride | Nil |
| Titanium tetrachloride | 1.28 |
| Ferric chloride | 2.26 |
| Aluminum chloride | 94.6 |
| Non-volatiles | 1.86 | was reacted with 81.0 grams of triisobutyl aluminum analyzing as follows: aluminum, 13.4 percent by weight, triisobutyl aluminum, 90.2 mol percent and diisobutyl aluminum hydride, 6.3 mol percent over a period of ½ hour at a temperature of 100° C. and a pressure of 14.7 pounds per square inch gauge under a slow stream of nitrogen. The mixture obtained was a dark liquid. 123 grams of this mixture containing the mixed alkyl aluminum chlorides was placed in a 500 cc. Morton flask and heated to 120° C. while ethylene was passed therethrough over a period of one hour. The saturated solution was cooled to a temperature of 26° C. and 0.7 cc. of titanium chloride was added thereto. Ethylene was passed through the resulting solution at 70° C. In one hour, holding the temperature between 70° and 100° C. 1.272 cubic feet of ethylene was absorbed. The telomer alkyl obtained was then hydrolyzed to give a mixture of paraffins by adding to it a mixture containing 25 grams of water and 25 grams of 38 per cent hydrochloric acid. Analysis showed the conversion of isobutyl groups to higher molecular groups amounts to about 50 per cent.

Example II

A new batch of triisobutyl aluminum chloride was prepared in a manner identical to that of Example I and transferred to a fine fritted glass filter having a pore size of 10 microns and filtered by gravity to give a dark liquid having an alkyl to chloride ratio of 2 to 1.5. 106.3 grams of the filtrate containing the mixed alkyl aluminum chlorides were placed in a 500 cc. Morton flask and heated to 90° C. while ethyelne was passed therethrough over a period of two hours. The saturated solution was cooled to a temperature of 26° C. and 0.7 cc. of titanium tetrachloride was added thereto to give an aluminum to titanium ratio of 200 to one. Ethylene was passed through the mixture after the same had been heated to 100° C. The reaction was continued for 3 hours and 50 minutes, during which time 2.976 cubic feet or 107.5 grams of ethylene was taken up to give an ethylene to alkyl ratio of 3.35:1. The telomer alkyl was hydrolyzed in a manner similar to that employed in Example I, 150.4 grams of mixed paraffins were obtained. During the hydrolysis 0.077 mol of isobutane was evolved. Since there were 1.134 mols of isobutylene available on the alkyl aluminum chloride it is apparent that the conversion of isobutyl groups to higher molecular weight groups amounts to 93.2 percent.

From a consideration of the above it can be seen that the desired telomerization can be obtained whether the original dark-colored reaction product, or a purified portion thereof, resulting from the reaction of the impure aluminum chloride with the alkyl aluminum is used in the telomerization reaction. That heating at an elevated temperature during the period when the mixed alkyl aluminum halides are being activated results in an increased ethylene absorption rate during the telomerization reaction is apparent from the following.

Example III 104 grams of the same filtrate containing the mixed alkyl aluminum chlorides employed in Example II was maintained at a temperature of 26° C. (room temperature) over a period of 2½ hours while ethylene was passed therethrough. 0.77 cc. of titanium tetrachloride was added to the filtrate and the mixture raised to 100° C.

Over a period of 4 hours ethylene was passed therethrough. 2.507 cubic feet or 90.8 grams of ethylene was absorbed during this period to give an ethylene to alkyl ratio of 2.911 to one. The product was hydrolyzed in the manner of Examples I and II to yield 132 grams of mixed paraffins. During the hydrolysis 0.125 cubic foot of isobutane was evolved. With 1.114 mols of isobutylene initially available this amounts to a conversion of isobutyl groups to higher molecular weight groups of 88.7 percent.

The absorption rate is determined by the total grams of ethylene absorbed per total grams of catalyst used per hour. In Example II wherein the alkyl aluminum chlorides were saturated with ethylene at an elevated temperature, 90° C., the absorption rate was 0.264 gram of ethylene absorbed per gram of catalyst per hour. In Example III wherein the saturation temperature was atmospheric, 26° C., the absorption rate was 0.2182. Therefore there was an increase of 17.34 percent in the absorption rate of Example II over Example III.

Obviously many modifications and variations of the invention, as hereinabove set forth, can be made without departing from the spirit and scope thereof, and therefore only such limitations should be applied as are indicated in the appended claims.

We claim:

1. A process for preparing organo aluminum telomers which comprises reacting an aluminum alkyl with an impure aluminum chloride having the following composition:

| | Percent by weight |
|---|---|
| Silicon tetrachloride | Nil–½ |
| Titanium tetrachloride | ½–2 |
| Ferric chloride | ½–4 |
| Aluminum chloride | 88.5–98.0 | at a temperature of about 40° to about 150° C. to obtain a mixture containing an alkyl aluminum chloride, saturating said mixture with ethylene, adding titanium tetrachloride in a molar ratio of Ti:Al of about $1/500$ to $1/50$ to said saturated mixture and thereafter passing ethylene through the resulting mixture to obtain an organo aluminum telomer.

2. A process for preparing organo aluminum telomers which comprises reacting triisobutyl aluminum with an impure aluminum chloride having the following composition:

| | Percent by weight |
|---|---|
| Silicon tetrachloride | Nil–½ |
| Titanium tetrachloride | ½–2 |
| Ferric chloride | ½–4 |
| Aluminum chloride | 88.5–98.0 | at a temperature of about 40° to about 150° C. to obtain a mixture containing isobutyl aluminum chlorides, saturating said mixture with ethylene, adding titanium tetrachloride in a molar ratio of Ti:Al of about $1/500$ to $1/50$ to said saturated mixture and thereafter passing ethylene through the resulting mixture to obtain an organo aluminum telomer.

3. A process for preparing organo aluminum telomers which comprises reacting an aluminum alkyl with an impure aluminum chloride having the following composition:

| | Percent by weight |
|---|---|
| Silicon tetrachloride | Nil–½ |
| Titanium tetrachloride | ½–2 |
| Ferric chloride | ½–4 |
| Aluminum chloride | 88.5–98.0 | at a temperature of about 40° to about 150° C. to obtain a mixture containing alkyl aluminum chloride, saturating said mixture with ethylene at a temperature of about 40° to about 150° C., adding titanium tetrachloride in a molar ratio of Ti:Al of about $1/500$ to $1/50$ to said saturated mixture and thereafter passing ethylene through the resulting mixture to obtain an organo aluminum telomer.

4. A process for preparing organo aluminum telomers which comprises reacting triisobutyl aluminum with an impure aluminum chloride having the following composition:

| | Percent by weight |
|---|---|
| Silicon tetrachloride | Nil–½ |
| Titanium tetrachloride | ½–2 |
| Ferric chloride | ½–4 |
| Aluminum chloride | 88.5–98.0 | at a temperature of about 40° to about 150° C. to obtain a mixture containing isobutyl aluminum chlorides, saturating said mixture with ethylene at a temperature of about 40° to about 150° C., adding titanium tetrachloride in a molar ratio of Ti:Al of about $1/500$ to $1/50$ to said saturated mixture and thereafter passing ethylene through the resulting mixture to obtain an organo aluminum telomer.

5. A process for preparing organo aluminum telomers which comprises reacting an aluminum alkyl with an impure aluminum chloride having the following composition:

| | Percent by weight |
|---|---|
| Silicon tetrachloride | Nil–½ |
| Titanium tetrachloride | ½–2 |
| Ferric chloride | ½–4 |
| Aluminum chloride | 88.5–98.0 | at a temperature of about 40° to about 150° C. to obtain a mixture containing alkyl aluminum chloride and insoluble materials, filtering said mixture to obtain a filtrate predominating in said alkyl aluminum chloride, saturating said filtrate with ethylene at a temperature of about 40° to about 150° C., adding titanium tetrachloride in a molar ratio of Ti:Al of about $1/500$ to $1/50$ to said saturated filtrate and thereafter passing ethylene through the resulting mixture to obtain an organo aluminum telomer.

6. A process for preparing organo aluminum telomers which comprises reacting triisobutyl aluminum with an impure aluminum chloride having the following composition:

| | Percent by weight |
|---|---|
| Silicon tetrachloride | Nil–½ |
| Titanium tetrachloride | ½–2 |
| Ferric chloride | ½–4 |
| Aluminum chloride | 88.5–98.0 | at a temperature of about 40° to about 150° to obtain a mixture containing isobutyl aluminum chlorides and insoluble materials, filtering said mixture to obtain a filtrate predominating in said isobutyl aluminum chlorides, saturating said filtrate with ethylene at a temperature of about 40° to about 150° C., adding titanium tetrachloride in a molar ratio of Ti:Al of about $1/500$ to $1/50$ to said saturated filtrate and thereafter passing ethylene through the resulting mixture to obtain an organo aluminum telomer.

References Cited by the Examiner

UNITED STATES PATENTS 2,898,330  8/59  Isbenjian _____ 260—94.9
3,100,231  8/63  Roha et al. _____ 252—429

TOBIAS E. LEVOW, *Primary Examiner*.